United States Patent Office 3,262,381
Patented July 26, 1966

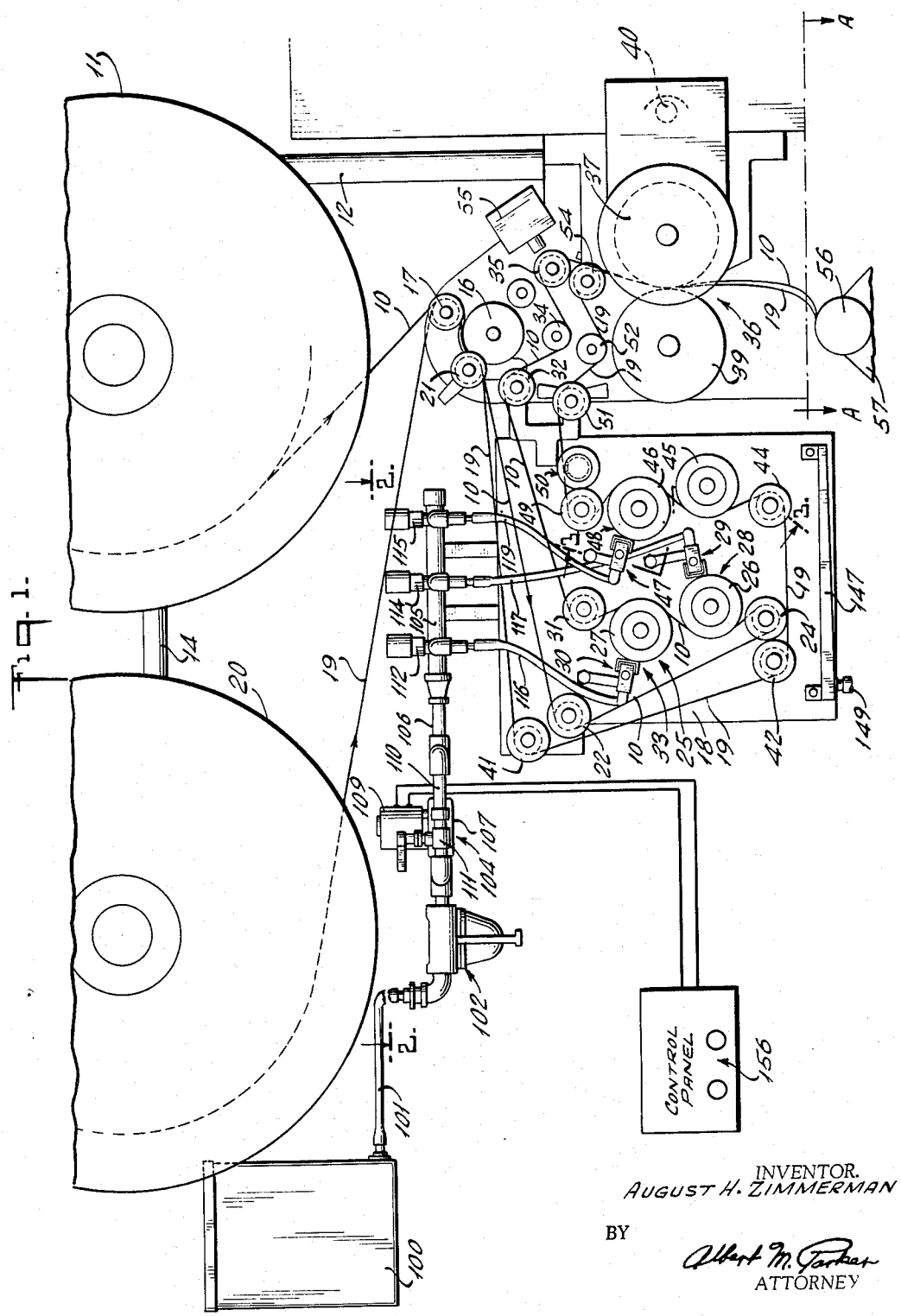

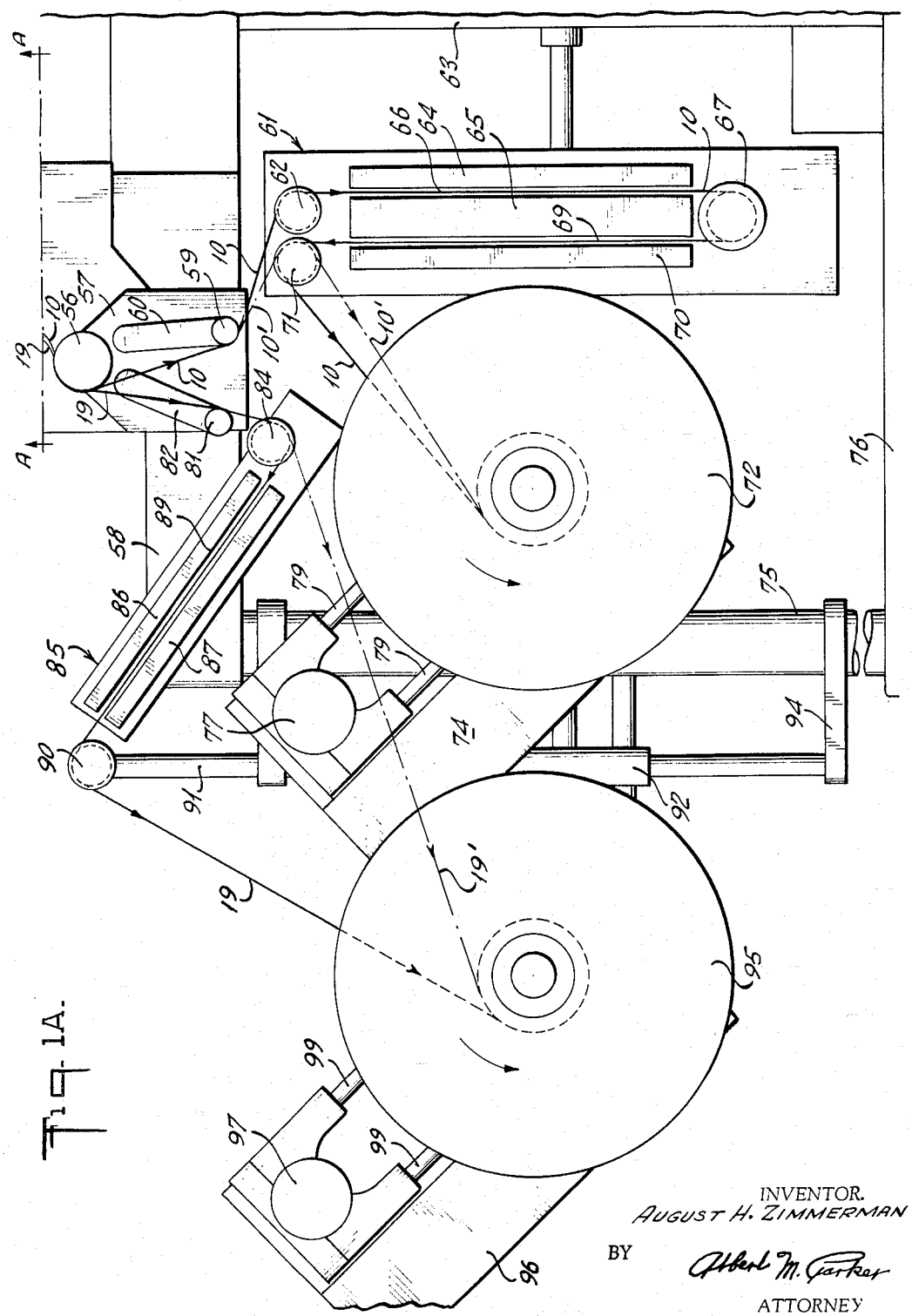

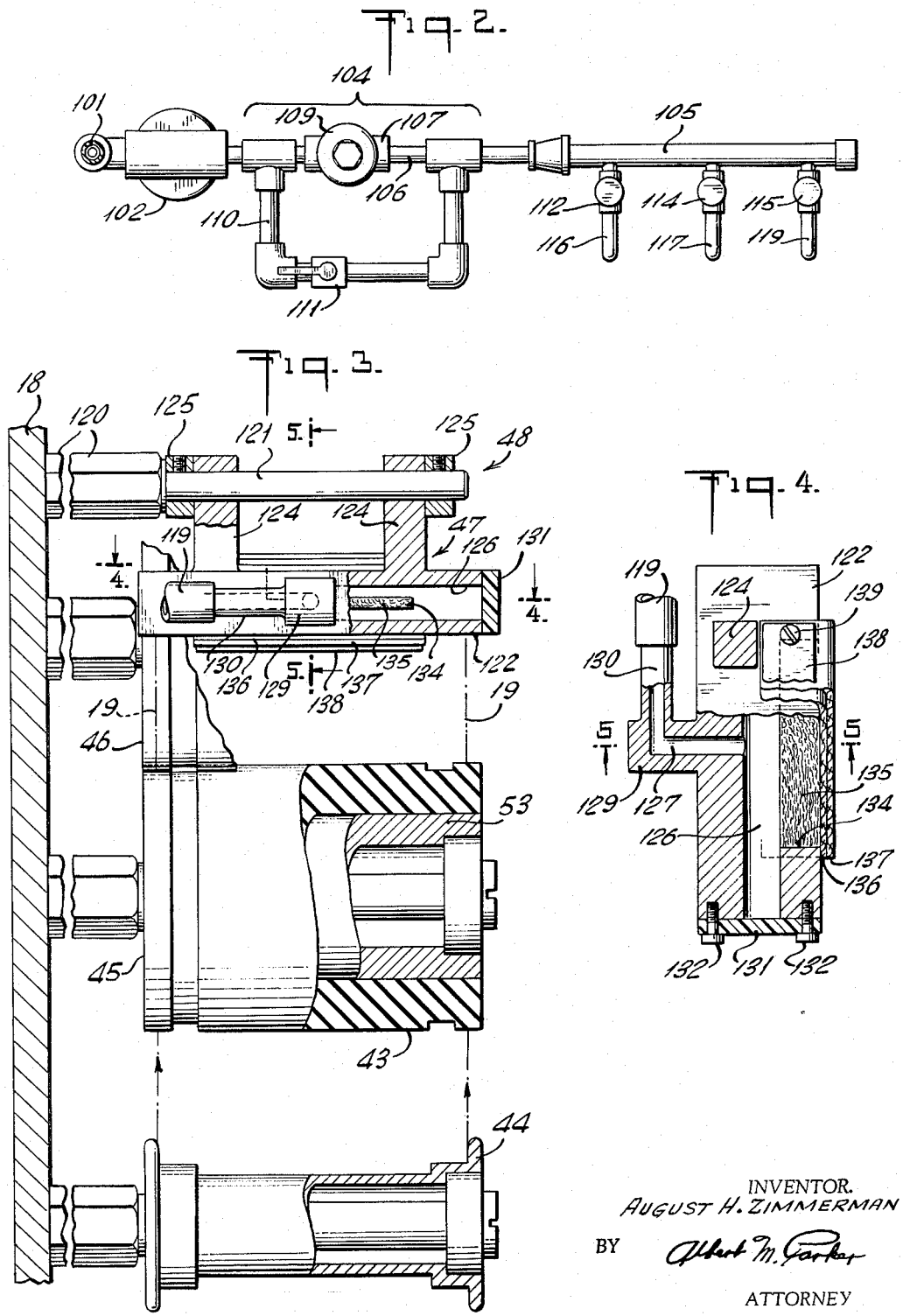

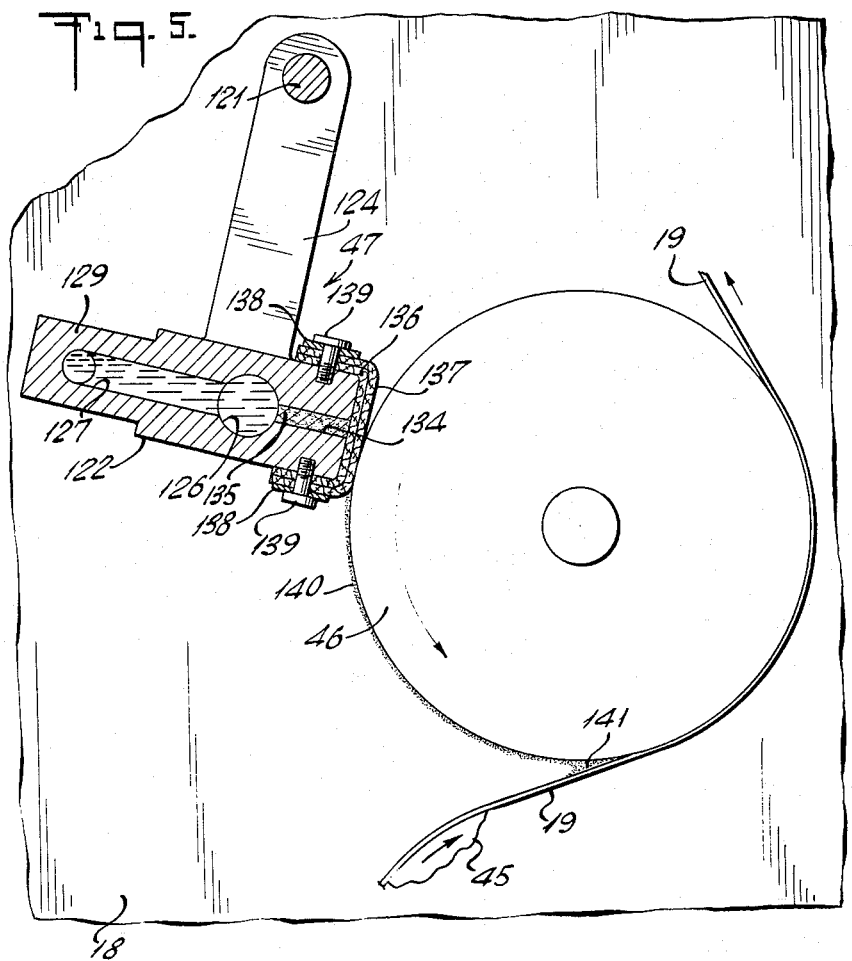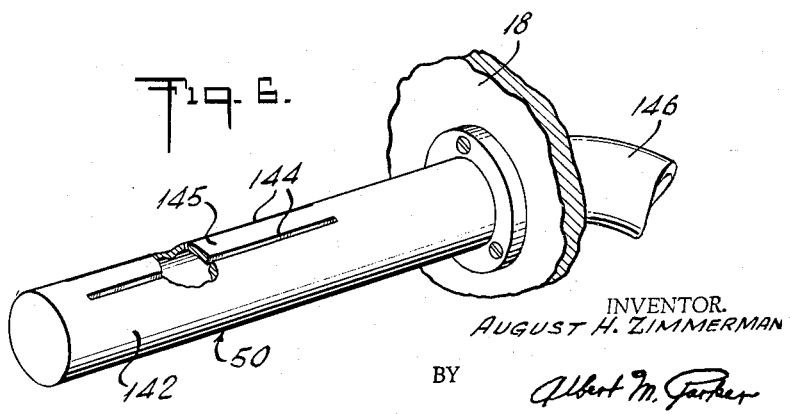

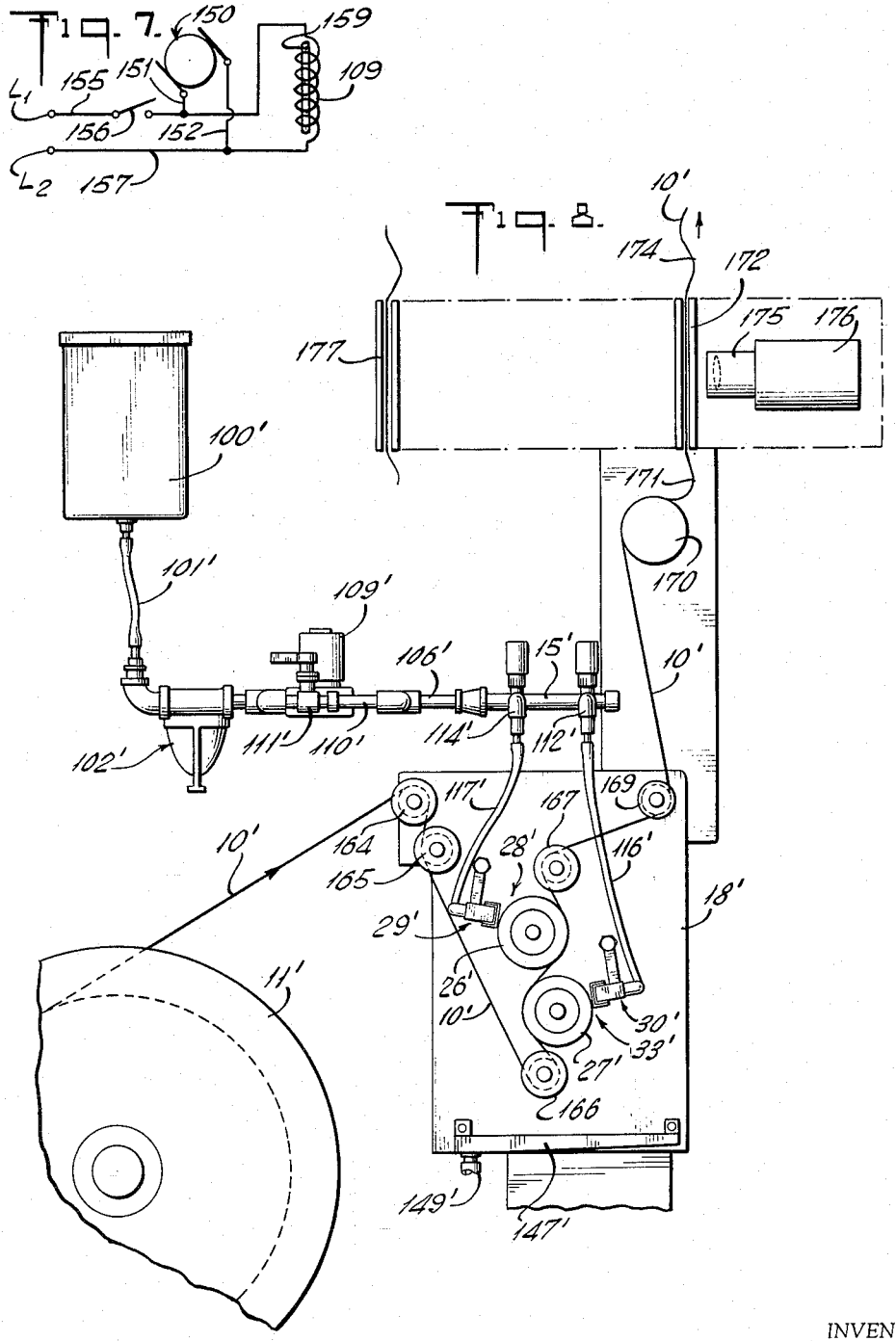

3,262,381
METHOD AND APPARATUS FOR IMPROVING UPON THE REPRODUCTION OF IMAGES RECORDED ON A PHOTOGRAPHIC FILM
August H. Zimmerman, West Englewood, N.J., assignor to Deluxe Laboratories, Inc., New York, N.Y., a corporation of New York
Filed Sept. 30, 1963, Ser. No. 312,607
9 Claims. (Cl. 95—75)

This invention relates to a method and apparatus for improving upon the reproduction of images recorded on a photographic film. More particularly the invention is concerned with method and apparatus for rendering surface blemishes on motion picture film substantially invisible at the time that copies, or other reproductions, are made from such film.

For the purpose of illustration, this invention will be described as applied to the making of positive, or release, motion picture prints from photographic negatives, either by contact or optical printing, though the invention is not necessarily so limited. It could, for instance, be employed for eliminating surface blemishes on a film employed in any apparatus involving reproduction of images recorded on that film where that reproduction is effected by the use of light, so, in the absence of the invention, would result in defects in the image reproduced as a result of surface blemishes upon the initial film.

Though scratches are the most common type of surface blemishes encountered on photographic negatives, other surface defects, such as digs, abrasions and cinch marks also occur. The use of the term "surface blemishes" is accordingly intended to encompass the full range of surface defects. Surface blemishes which introduce defects into reproductions of images recorded on photographic negatives may be on either the emulsion side or the support side. Commonly scratches on either side of black and white negatives will appear white on a positive print made therefrom. On color film the resultant defect on the print will depend upon the depth of penetration of the scratch, or other blemish, upon the emulsion side of the color negative. Surface blemishes other than scratches on the negative produce various defects on the positive, as are known to those skilled in the art.

Efforts have been made in the prior art to overcome this condition by various treatments of the film surface. These have ranged from lacquering the surface of the negative with a lacquer having an index of refraction close to that of the film support and emulsion, to immersing the negative and, in the case of contact printing, also the positive, in a liquid, again having an index of refraction approximating that of the support and emulsion. In one instance the immersion was attempted right at the printing aperture. None of the prior art efforts, however, have been truly commercially successful, having regard to the speed at which the films must be run for the making of prints on an economical basis and the necessity for getting the lacquer or liquid on the film as it is unreeled and off of it as it is reeled up after the printing operation. The invention, however, eliminates all the defects in the prior art proposals and provides for film treatment to render surface blemishes substantially invisible at the time of printing while still enabling the printing to be effected in simple, economical manner at the speeds desired.

It is, accordingly, the principal object of the invention to provide a method and apparatus for rendering motion picture film surface blemishes substantially invisible at the time of making reproductions of the images carried by the film.

Another object is to provide such method and apparatus for producing the desired result in simple economical manner with flexibility of operation and ease of control.

Another object lies in the provision of method and apparatus for wetting motion picture films with liquid of desired refractive index and for drying such liquid from the same while enabling normal contact or optical printing to be proceeded with.

A further object is to provide a method and apparatus for effecting such wetting on a selective basis with respect to the sides of the negative film and also to the emulsion side of the positive film in advance of a contact printing step.

A further object lies in the provision of apparatus for controlling the wetting of the motion picture film in a printer simultaneously with the control of the film traversing mechanism.

A still further object lies in the provision of method and apparatus for effecting a uniform wetting of either, or both, surfaces of the film with a desired amount of wetting liquid.

A still further object resides in the provision of a novel combination of motion picture film wetting mechanism, printing mechanism and drying mechanism whereby the wetting liquid applied as desired to one, or both, of the negative and positive films for effectiveness during the image producing operation is substantially removed from such film prior to the subsequent rereeling thereof.

Further and more detailed objects of the invention will in part be obvious and in part be pointed out as the description of the same, taken in conjunction with the accompanying drawing proceeds, it being understood that the showing in the drawing is for illustrative and not limiting purposes.

In that drawing, wherein like reference characters refer to like parts throughout the several views:

FIG. 1 is a somewhat schematic side elevational view of a contact printer having the film wetting apparatus of the invention applied thereto.

FIG. 1A is a similar view of the remainder of the apparatus of which the first portion is shown in FIG. 1, the complete apparatus of this illustrative embodiment of the invention being depicted by fitting FIGS. 1 and 1A together along the line A—A appearing in both figures.

FIG. 2 is a fragmentary view in plan of a portion of the mechanism for selectively supplying coating liquid to the negative and positive films in the apparatus of FIGS. 1 and 1A, the view being taken in the direction of the arrows from line 2—2 of FIG. 1, a portion of the liquid supply conduit being shown in section.

FIG. 3 is a view in end elevation of the mechanism for coating one side of the positive film, certain of the parts of such coating mechanism being omitted for clarity of illustration, the view being taken in the direction of the arrows from the broken line 3—3 of FIG. 1, certain of the parts of the mechanism being shown in section.

FIG. 4 is a view in horizontal section through a liquid applying pad device of the coating mechanism of FIG. 3, the section being taken in the direction of the arrows along the broken line 4—4 of FIG. 3, portions of certain of the parts of the pad device being shown in plan.

FIG. 5 is a view on an elongated scale in vertical transverse section through the upper portion of the device for coating the positive film, the section being taken in the direction of the arrows along line 5—5 of FIG. 3, certain of the parts being shown in side elevation.

FIG. 6 is a fragmentary view in perspective of a vacuum device which forms a part of the mechanism which treats the positive film in advance of the printing station in the apparatus of FIGS. 1 and 1A, a portion of the device being broken away for clarity of illustration.

FIG. 7 is a wiring diagram showing the manner of control of the printing apparatus of FIGS. 1 and 1A; and FIG. 8 is a fragmentary somewhat schematic view of an optical printer incorporating the film wetting system of the invention.

As is apparent from the above, the application of the invention to two different types of photographic printing apparatus is illustrated herein. The first application shown in FIGS. 1–7 inclusive, is of a contact printer wherein the exposed negative and the positive film strip to be printed are run together at the same speed and in contact through a printing station. The application of the invention shown in FIG. 8 is to an optical or projection printer wherein the negative film strip travels intermittently through a film gate, the image from the film being printed by optical means on a positive film at a position spaced from the negative.

Turning now to the first illustrative embodiment of apparatus in accordance with the invention, there is shown in FIG. 1, the upper or first portion of such apparatus, wherein negative and positive film strips are unreeled, coated, and traversed together through a contact printer. In FIG. 1A, which shows the lower or second portion of the apparatus, the negative and positive film strips are separated, are separately dried, and are rewound.

In FIG. 1 a negative film strip 10 having images recorded thereon is shown as being unreeled from a reel 11, which is supported, by means not specifically shown, on a framework having vertical members of which one is shown at 12 and horizontal members of which one is shown at 14. Film strip 10 is drawn from reel 11, which may be idle and suitably retarded by friction means (not shown), by a horizontally journalled drive sprocket means 16. Sprocket means 16, which is driven by a motor (not shown) through conventional mechanism such as shafts and speed reducing gearing, also not shown, has toothed wheels or sprockets at the opposite ends thereof, the teeth of the sprockets meshing with the spaced sprocket tooth-receiving openings along each edge of the film strip. Film strip 10 is led to the sprocket means 16 over an idle guide roller 17 mounted on the framework of the apparatus as shown. The sprocket-means 16 serves also to pull a positive film strip 19 to be printed upon from an idle, suitably retarded, reel 20, strip 19 passing beneath strip 10 as the two strips pass over the guide roller 17 and lying on top of strip 20 as they travel partially around the sprocket means 16. Strips 10 and 19 are held down in firm contact with the sprocket means 16 by a conventional retractible hold down roller 21, as shown.

The negative film strip 10 leaves the sprocket means 16 beyond the hold down roller 21 and travels to the left (FIG. 1) over and partially around an idler roller 22 which is journalled on an axle projecting from a vertically disposed supporting plate 18. From the roller 22 the negative strip 10 travels downwardly to pass beneath and partially around a similar idler roller 24 and thence upwardly and somewhat to the left around a large rubber covered idler roller 26 which coats the emulsion side of the negative film strip with treating liquid. Roller 26 is of a construction similar to that of roller 45, to be subsequently described in connection with FIG. 3. The film strip 10 then travels upwardly and somewhat to the right to pass partially about a rubber covered idler roller 27, which has a construction similar to that of roller 26. Roller 27 coats the base side of the negative film strip 10. From roller 27 the negative film strip 10 passes upwardly and slightly to the left to pass partially about an idler roller 31 from which it passes upwardly into the right to a further idler roller 32. The rubber covered rollers 26 and 27 form parts of devices generally designated 28 and 33 which coat the emulsion side of the negative film strip and the opposite side of the support or base thereof respectively. Such coating devices will be described in detail in connection with FIG. 3, which shows a similar coating device 48 for coating or wetting the emulsion side of the positive film strip 79.

From the idler guide roller 32 the negative film strip 10 passes downwardly partially around and beneath a further idler guide roller 34, from which it passes somewhat upwardly and to the right to pass partially around a guide roller 35. Confronting roller 35 and spaced somewhat therefrom beyond the negative film strip 10 passing thereover is a conventional cueing device 55 associated with the printer 36 to be described. From roller 35 the negative film strip 10, which has been coated on both sides with treating liquid in the manner above generally described, passes downwardly to meet the positive film strip 19, which may be either dry or coated with treating liquid in a manner to be described, the negative film strip 10 and positive film strip 19 passing together at the same speed and in face-to-face relationship with the emulsion side of the negative and positive film strips in contact through the printing station of the printer 36.

Such printer 36 is provided with a drive sprocket 37 and an idler back-up roller 39, the sprocket 37 providing the driving tension which pulls both film strips through the apparatus after they have left the drive sprocket means 16. The printer 36 is provided with a light source, indicated generally at 40, whereby light of a predetermined desired intensity passes through the negative film strip 10 to expose the positive film strip 19 to the image on the negative as the film strips travel together through the printer.

The positive film strip 19, upon leaving the drive sprocket means 16, is separated from the negative film strip 10 and travels to the left to pass over and partially around an idler guide roller 41 mounted on the vertical supporting plate 18. From roller 41 the strip 19 travels downwardly to an idler guide roller 42 and then horizontally to a similar guide roller 44. From roller 44 the positive film strip 19 passes upwardly and to the left and partially about a rubber covered idler roller 45 and thence to the right partially about a similar roller 46 which functions to coat the emulsion side of the positive film strip. From roller 46 the now coated film strip 19 passes upwardly and partially around an idler guide roller 49 from which it passes generally horizontally to a further guide roller 51, downwardly to a guide roller 52, and thence to the right to the guide roller 54 where it is brought together with the coated negative film strip 10, in the manner above described, prior to the passage together of the two film strips into the contact printer 36. In the run of the strip 19 between guide rollers 49 and 51, the lower uncoated support or base side of the film strip may travel above, preferably slightly spaced from the surface of a fixed tubular member generally designated 50 and which is shown more particularly in FIG. 6. Means 50, which will be more particularly described hereinafter, subjects the uncoated side of the film strip 19 to suction action whereby to remove excess coating liquid from the edges of such strip.

After passing through the continuous contact printer 36, the film strips 10 and 19 are slack, being permitted to festoon to a slight degree prior to their passage partially about a sprocket means 56, driven in synchronism with sprocket means 16 and 37 from the driving motor for the apparatus. Sprocket means 56 is journalled on a frame member 57. Because of the slack thus created in film strips 10 and 19 between sprocket means 37 and 56, the pulling forward of the film strips by means 56 cannot affect the manner of presentation of the film strips to the contact printer 36. The negative film strip 10, which is in contact with the guide member 56, leaves such surface to pass downwardly and somewhat to the right toward a dryer device 61 in which the coating liquid is completely evaporated from the film strip, whereby to restore such strip to its original condition. Drier 61 has an entering guide roller 62 at its upper right hand portion. In its travel from member 56 to the guide roller 62 the film strip 10 is lightly tensioned by a guide member 59 in the form of a pin projecting from a gravity biased tensioning arm 60.

The drier 61 is of the forced warm air type, both surfaces of the film strip being subjected to jets of air heated, for example, to 80° F., and under a head, for example, of 4 to 5 pounds per square inch. The drier 61 has a first elongated vertical plenum chamber 64 and a second plenum chamber 65 parallel to chamber 64 and spaced therefrom to provide a narrow vertical disposed passage 66 therebetween. The confronting faces of chambers 64 and 65 are provided with a plurality of openings or jet nozzles (not specifically shown) therethrough so that the opposite sides of the film strip are subjected to jets of warm air. Upon emerging from passage 66, the film strip passes under and partially around an idler guide roller 67 in the chamber of drier 61 and then passes upwardly through a further narrow vertical passage 69 presented between the plenum chamber 65 and a further elongated plenum chamber 70. The confronting faces of chambers 65 and 70 are provided with a plurality of openings so that the film strip 10 is again subjected on both sides thereof to warm air. The strip 10 emerges from passage 69 in fully dried condition to pass over and partially around an idler guide roller 71 from which it travels to a conventional take up reel 72 which is journalled on a sub-frame 74 which in turn is supported on a vertical standard 75 secured to the base 76 of the portion of the device shown in FIG. 1A. The reel 72 is driven counter-clockwise (FIG. 1A) by a separate conventional variable torque motor (not shown) connected to the shaft carrying the reel. A flanged film guide roll 77, mounted on parallel guides 79, is adapted to be positioned in contact with the film being wound, with the flanges on the opposite ends of the guide overlying the edges of the wound film.

The positive film strip 19 is separated from the negative film strip 10 as the former leaves the sprocket means 56, and travels downwardly to pass partially around an idler guide roller 84 at the entering end of a drier 85. Strip 19 is lightly tensioned in its travel from guide roller 56 to the roller 84 by a pin member 81 which is affixed to the pivotally mounted gravity biased arm 82.

The drier 85 has two opposed parallel plenum chambers 86 and 87, such chambers presenting a narrow elongated passage 89 between them. Chambers 86 and 87 are supplied with warm air under pressure in the same manner as drier 61, such air leaving the chambers 86 and 87 through holes or nozzles (not specifically shown) to impinge upon the opposite faces of the film strip 19. Such strip leaves the dryer 85 in fully dried condition to pass over and partially around an idler guide roller 90 which is mounted on a standard 91, 92 and a horizontal arm 94, all of such members being attached to standard 75, as shown.

Upon leaving guide roller 90, the now dried positive film strip 19 travels to a take-up device having a reel 95 driven in a counter-clockwise direction. Reel 95 is journalled on a sub-frame 96, is driven by a separate variable torque motor (not shown) and is provided with a flanged guide roll 97, slidably mounted on parallel rods 96, as shown.

The apparatus is of course usable for printing without any wetting of the film, in which case of course no drying is needed. When the apparatus is thus used, the negative film strip 10 travels from the tensioning device 59 directly around the idler guide roller 71 and thus to the roller 72, as shown in the dot dash lines 10′ in FIG. 1A. The positive film strip drier 85 may be similarly by-passed by running the positive film strip 19 directly from the idler guide roller 84 to the take-up reel 95 in the path shown by the dot and dash line 19′ in FIG. 1A.

The coating liquid which is supplied to each of the coaters 28, 33, and 48 is fed thereto in the manner shown in FIGS. 1 and 2. A supply tank 100 supported on the frame of the apparatus by means not shown has a delivery tube 101 leading from adjacent its bottom end to a filtering and settling cleaner 102. From the device 102 the liquid passes to a control and priming unit (FIG. 2) and thence to a manifold 105. The unit 104 has a pipe 106 leading from the device 102 to the manifold 105, there being a selectively operated valve 107 controlled by a solenoid 109 interposed in pipe 106, whereby to start and stop the flow of coating liquid to the manifold. Valve 107 is by-passed by a pipe 110 having a manually operated shut-off valve 111 interposed in it. The manifold 105 may be filled with liquid from the gravity supply tank 100, when valve 107 is closed, by opening the valve 111. Thus the coating liquid supply system may be made ready for immediate operation upon the start of the traversing of film strips 10 and 19 through the apparatus. The liquid supply feeder or head 47 of coating device 48 is pivotally supported on vertical plate 18 of the apparatus in the manner shown in FIG. 3. A rod-like member 120 is secured to and projects horizontally from plate 18. The outer, front end 121 of member 120 is of circular cylindrical configuration and serves as the immediate support for the body 122 of the feeder 47. Body 122 has two spaced parallel arms 124 integral therewith, such arms having aligned passages therein adjacent their outer ends in which the portion 121 of the member 120 is journalled. The body 122 is maintained in position on member 120 by means of stop-collars 125 positioned on part 121 on opposite sides of the arms 124, as shown.

The construction and manner of operation of the coating devices 28, 33 and 48, which are similar, will be more readily understand upon the consideration of FIGS. 3, 4 and 5 which illustrate the coating device 48 in detail. The coating devices 28, 33 and 48 are supplied with coating liquid from the manifold 105 through flexible conduits 116, 117 and 119, respectively. The rate of flow of coating liquid to the respective coating devices may be controlled by manually adjusted needle valves 112, 114 and 115 interposed between the manifold and the flexible conduits.

The body 122 of the liquid supply device 147 is provided with a plenum chamber 126 which extends throughout substantially the full length of such body. The plenum chamber 126 is supplied with coating liquid through a passage 127 in a central hollow boss 129 integral with and projecting from the rear of the body 122, boss 129 having a laterally extending hollow stem 130 over which the end of tube 119 sealingly fits. One end of the plenum chamber 126 is closed by a transparent sight glass or window 131 which is sealed to body 122 by a suitable gasket and is held thereon by screws 132, as shown. The wall of body 122 which confronts the roll 46 is provided with a longitudinally extending passage 134 therethrough, passage 134 being symmetrically located relative to the width of the film strip 19 and having a length which is somewhat less than the total width of the film strip but equal to the width of the central, picture area of the strip. The passage 134 is filled with a tightly fitting porous wick 135 through which the coating liquid slowly flows under the gravity head provided by the supply system 100, 101, 105 and 109. Overlying the forward edge of the body 122, and thus the forward edge of passage 134, are two superimposed layers 136 and 137 of porous fabric material such as cloth. The wick 135 and the layers of porous fabric material 136 and 137 together constitute a wick means by means of which liquid is transferred from the source of supply of the liquid, including chamber, to the surface of the coating roll or drum 46. Layers 136 and 137 are retained in place on body 122 by being folded over the upper and lower surfaces of body 122 and by overlying clips 138 retained by machine screws 139 extending through the clips and the edge portions of the fabric, and threaded into the body 122. The outer fabric layer 137 may be made, for example, of a fabric having a substantial pile, such as velvet, the pile being presented to the surface of the coating roll 46. The supply device 47 is freely pivoted on its support 120, 121, and is so located relative to roll 46 that it is gravity biased toward the roll and that the portion of the outer fabric adjacent the lower corner thereof 137 contacts the peripheral surface of the roll 46, as shown in FIG. 5.

The gravity head under which the coating liquid is supplied to the feeder 47, and the chosen setting of the control valve 115 for the feeder, are such that a thin coating 140 of liquid is deposited upon the surface of the transfer coating roll 46 as the peripheral surface of such roll rotates past the supply device 47. Preferably, the coating liquid is present on roll 46 in a layer 140 in such amount as to form a slight excess or bead of liquid 141 at the juncture of the film strip 19 and the peripheral surface of roll 46. The formation of the bead 141 insures that layer 140 will be of sufficient thickness for the complete coating of the emulsion side of the film strip 19. The operator, by observing bead 141, can readily adjust the valve 115 so that under stable running conditions of the apparatus the bead will remain of substantially constant size. The roll 46, being idle and driven by contact with the film strip 19, thus has a surface speed equal to the rate of travel of the strip and has no tendency to scuff the surface of the film which it coats.

The construction of the suction liquid-removing means 50 shown in FIG. 1 as cooperating with the uncoated support or base side of the positive film strip 19 is shown in FIG. 6. As above noted, the film preferably travels slightly spaced above the upper surface of means 50. Means 50 consists of an elongated circular cylindrical tube having its inner end mounted upon the plate 18, and its outer end closed by an end member. The outer smooth surface 142 of the sleeve is smooth and imperforate except for two longitudinally extending narrow slots 144 spaced at equal angles from the line at which the film strip approaches the sleeve most closely to define a smooth central zone 145. The device 50 is connected to a source of suction (not shown) through a tube 146; excess liquid on the film strip 19, particularly the edges thereof, is removed from the film by being sucked into the slots 144. Thus, there is avoided the formation of liquid droplets at the interface between the negative and positive strips as they pass together through the printer 36, as well as other uneven thickness of liquid coating between the strips either of which conditions could cause image distortion.

Liquid which may be dropped from the various parts of the apparatus is caught in a drip pan 147 which is disposed beneath the coating devices and is connected to a sump (not shown) through a conduit 149. The construction of the coating devices is such, however, that no substantial drip from them occurs at any time, including the times at which the apparatus is starting, stopping, and running under steady conditions. When the valve 107 is closed, the liquid supply means including the body 122 of device 47, the conduit 119 leading thereto, the manifold 105 and the pipe 106 are subjected to atmospheric pressure which acts upon the liquid in chamber 126 through fabric layers 136 and 137 and the wick 135. Such pressure, taken with the small size of the passages through the wick and fabric layers, prevents much, if any, loss of liquid by dripping from the liquid supply means. Preferably, the vertical distance between the manifold 105 and the coating devices 28, 33, and 48 is maintained near a minimum. The supply tank 100 is located at a sufficient height above pipe 106 to yield a satisfactory gravity flow of liquid to such pipe and manifold when valves 107 and 155 are open.

The sprocket means 16, 37 and 56 may be driven by a single motor in the manner generally described. Such motor is designated 150 in FIG. 7. The apparatus is preferably controlled so that the valve 107 is opened when the motor 150 is energized, and is closed when the motor is deenergized. One manner in which this may be effected is shown in FIG. 7, wherein the lead wires 151 and 152 of motor 150 are shown as being connected to terminals $L_1$ and $L_2$ of a current source through wires 155 and 157, respectively. A manually operated switch 156 is interposed in wire 155 so as selectively to start and stop the motor. The solenoid 109 for valve 107 is connected in parallel with the motor 150, as shown. The solenoid 109 may include a solenoid plunger 159 which is spring-biased in such direction as to urge the valve 107 toward its closed position. When the solenoid is energized the plunger 159 is thrust in such direction as to overcome the spring and to open the valve.

In FIG. 8 there is shown a second illustrative embodiment of apparatus in accordance with the invention with which film wetting and drying devices are employed. Such apparatus is an optical or projection printer wherein normally the negative is run intermittently through the film gate of the projection head to project onto the positive film strip which travels in synchronism with the negative. Such apparatus includes means generally similar to those of FIGS. 1 to 6, inclusive, for coating both surfaces of the negative film 10' with a liquid having an index of refraction close to that of both the film, support and emulsion layer. Parts in FIG. 8 which are similar to those of the first described embodiment are designated by the same reference characters but with an added prime.

The negative film strip 10', which is wound upon a reel 11' with its emulsion side outwardly, is shown as being unreeled and as traveling into the coating apparatus over staggered idler guiding rollers 165 and 166 in succession, rollers 165 and 166 functioning as a tensioning device to apply a suitable back tension to strip 10' in its passage through the coating apparatus. From roller 165 the film strip travels downwardly and partially around a lower guide roller 166 and then passes upwardly in succession through a first coating means 33', which coats the support or base side of the film, and a second coating means 28' which coats the emulsion side of the film. The thus coated film strip leaves the liquid coating apparatus by passing over guide rollers 167 and 169 in succession, passing upwardly to a driven sprocket means 170 which pulls the film strip from the reel 11' and through the liquid coating apparatus.

After leaving the drive sprocket 170, the film passes into a loop 171 and thence into and through a conventional film gate 172 including intermittent drive mechanism disposed in front of a projector 175 having a light source 176. On leaving the gate 172, the film passes into a loop 174 from which it is withdrawn to a suitable drying device, if desired, and to a take-up reel.

The image projected from the negative film strip 10' by projector 175 is received by a positive film to be printed upon in a film gate as seen at 177 through which it is fed intermittently like the negative in gate 172 and driven in synchronism therewith. Normally the raw positive film stock fed through the gate 177 is new material so would not have any surface blemishes to be rendered invisible. Thus no wetting of such film would be needed.

Although the apparatus of the invention has been described primarily in connection with the making of release positives from negatives by contact or projection printing, it is to be understood that it may be employed to advantage wherever it is desired to reproduce images from a film, particularly where the film is defective by reason of surface blemishes. Typical further examples of the use of the apparatus of the invention are in the scanning of photographic film during telecasting and in "printing" of a magnetic tape record from motion picture or other film.

As above indicated, the coating liquid employed to render the blemishes invisible has an index of refraction approximating that of the film support as well as that of the emulsion. There have to be various compromises here because, in the first place, the film base and the gelatin overcoating on the emulsion have different indices of refraction and it is difficult to find a liquid suitable in all respects which has an index of refraction not varying too much from that of the base on the emulsion. Some liquids are too volatile or too toxic, others are not volatile enough so that the drying of the film is difficult. Then, again, there are others that cannot be used because they would attack the film.

One liquid that suitable, though somewhat toxic, is perchlorethylene whose index of refraction is 1.504, hence normally about midway between that of the 1.478 of the common triacetate base and the 1.52 of the usual gelatin overcoating on the emulsion. An improvement over this and the presently preferred liquid for use in accordance with the invention is made up of a mixture of 4 parts by volume of methyl chloroform (1,1,1-tricloroethane and 6 parts by volume of perchloroethylene (tetrachloroethylene). Still another effective liquid consists of a mixture of 9 parts toluene and 1 part Freon–113 liquid. This mixture again has an index of a refraction of about 1.5. Besides the Freon liquid reducing the index of refraction of the mixture, it also reduces flash hazards and the mixture is a good film cleaner. Needless to say any of the foregoing liquids and others suitable for the intended purpose which may suggest themselves to those skilled in the art would perform satisfactorily in the apparatus and in carrying out the method of the invention.

Although only a limited number of emboidments of the invention have been illustrated in the accompanying drawings and described in the foregoing specification, it is to be especially understood that various changes, such as in the relative dimensions of the parts, materials used, and the like, as well as the suggested manner of use of the apparatus of the invention, may be made therein without departing from the spirit and scope of the invention will now be apparent to those skilled in the art.

What is claimed is:

1. Apparatus for rendering invisible surface blemishes on a photographic film strip to be illuminated for reproducing a counterpart of the image carried thereby, which includes means for feeding said film strip along in the direction of its length, means for applying a film-like coating of a liquid having substantially the same index of refraction as that of said film on at least one side of said film as the same is moved, said coating means comprising a cylindrical drum formed to make surface contact across the width of the film being coated, liquid supply means adjacent the surface of said drum, said liquid supply means including a liquid chamber, wick means carried by said liquid supply means having one end thereof in contact with the liquid in said chamber and having the other end thereof in contact with liquid applying means, said liquid applying means being in contact with the surface of said drum for applying said liquid to said drum, means for passing light through said film in coated condition to form a reproduction of the images carried thereby on another medium and means to move said film away from the position of said light and reel the same up.

2. Apparatus as in claim 1, said liquid applying means comprising, a strip of fabric material engaged with the surface of said drum throughout the length thereof.

3. Apparatus as in claim 1 including, a support for said liquid supply means and means for mounting said supply means on said support for free swinging movement under the action of gravity for maintaining the contact of the same with said drum surface.

4. Apparatus for rendering invisible surface blemishes on a photographic film strip to be illuminated for reproducing a counterpart of the image carried thereby, which includes means for feeding said film strip along in the direction of its length, means for applying a film-like coating of a liquid having substantially the same index of refraction as that of said film on at least one side of said film as the same is moved, said coating means comprising a cylindrical drum formed to make surface contact across the width of the film being coated, liquid supply means, and a surface applicator connected to the liquid supply means and contacting and extending throughout the length of the drum to apply a thin uniform coating of liquid to the drum, means for directing film onto the surface of said drum tangential thereto, means for maintaining said film in contact with the surface of said drum for a substantial portion of the periphery thereof, and means for mounting said drum on an axis for free rotation whereby movement of said film past said drum will rotate said drum.

5. Apparatus for rendering invisible surface blemishes on a photographic film strip to be illuminated for reproducing a counterpart of the image carried thereby, which includes means for feeding said film strip along in the direction of its length, means for applying a film-like coating of a liquid having substantially the same index of refraction as that of said film on at least one side of said film as the same is moved, said coating means comprising a cylindrical drum formed to make surface contact across the width of the film being coated, means for mounting said drum on an axis for free rotation whereby movement of said film past said drum rotates said drum, liquid supply means, and a surface applicator connected to the liquid supply means and contacting and extending throughout the length of the drum to apply a thin uniform coating of liquid to the drum, means for passing light through said film in coated condition to form a reproduction of the images carried thereby on another medium, and means to move said film away from the position of said light.

6. Apparatus as in claim 5, comprising means to reel up the film after it has passed the position of said light.

7. Apparatus as in claim 5, wherein said surface applicator comprises a wick means connected to the liquid supply means and contacting and extending throughout the length of the drum whereby the portion of the wick means which contacts the drum applies a thin uniform coating of liquid thereto.

8. In the making of release positives from negative motion picture film having images recorded thereon, the method which comprises, roller coating both faces of said negative with even uniform coatings of a liquid having substantially the same index of refraction as that of the film base and the emulsion carried by said base, effecting said roller coatings by bringing said film faces and coating surfaces into contact and while said film faces and said coating surfaces are in contact moving the same together at substantially the same linear speed, moving said coated negative film intermittently through a first film gate, moving a positive motion picture film to be printed upon intermittently through a second film gate in spaced relationship with respect to said first film gate and in synchronism with respect to the movement of said negative film through said first gate, passing light through said negative and positive films to print images from said negative onto said positive, thereafter blowing air on said negative film to evaporate said liquid therefrom, and rereeling said negative film.

9. In the making of release positives from negative motion picture film having images recorded thereon, the method which comprises, roller coating at least one face of said negative with an even uniform coating of a liquid having substantially the same index of refraction as that of the film base and the emulsion carried by said base, effecting said roller coating by bringing said film face and an idle rotatable coating member having a coating surface into contact and while said film face and said coating surface are in contact driving the coating member solely by its contact with the film so that the coating surface of the rotatable coating member moves at substantially the same linear speed as the film, moving said negative film carrying said coating into opposed position with respect to a positive film to be printed upon, and passing light through said negative and said positive.

(References on following page)

References Cited by the Examiner

UNITED STATES PATENTS

| | | | |
|---|---|---|---|
| 1,525,423 | 2/1925 | Hernandez-Mejia | 95—89 |
| 2,878,741 | 3/1959 | Limberger | 95—73 |
| 2,987,955 | 6/1961 | Sassenberg | 352—130 X |
| 2,988,043 | 6/1961 | Sassenberg | 352—130 |
| 2,995,977 | 8/1961 | Imus et al. | 95—75 |
| 3,000,287 | 9/1961 | Heldens | 95—89 |
| 3,052,157 | 9/1962 | Debrie | 352—130 |
| 3,057,282 | 10/1962 | Luboshez | 95—89 |
| 3,104,603 | 9/1963 | Schwienbacher | 95—89 |
| 3,130,079 | 4/1964 | Von Meister | 95—1.7 X |
| 3,192,897 | 7/1965 | Young | 95—1.7 X |

OTHER REFERENCES

Journal of the Society of Motion Picture and Television Engineers, October 1957, vol. 66, pages 607–615.

JULIA E. COINER, *Primary Examiner.*

EVON C. BLUNK, *Examiner.*